United States Patent
Kuwahara et al.

(10) Patent No.: US 8,303,357 B2
(45) Date of Patent: Nov. 6, 2012

(54) CONDUCTOR-CONNECTING WASHER, CONNECTION MECHANISM USING THE SAME, AND METHOD OF MANUFACTURING CONDUCTOR-CONNECTING WASHER

(75) Inventors: Takashi Kuwahara, Tokyo (JP); Yoshiaki Ishiyama, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 13/083,518

(22) Filed: Apr. 8, 2011

(65) Prior Publication Data

US 2011/0287644 A1 Nov. 24, 2011

(30) Foreign Application Priority Data

May 24, 2010 (JP) ................................ 2010-118277
Feb. 24, 2011 (JP) ................................ 2011-037975

(51) Int. Cl.
  *H01R 11/11* (2006.01)
(52) U.S. Cl. ........... 439/883; 439/444; 411/160; 470/42
(58) Field of Classification Search .................. 411/154, 411/155, 158, 160–165; 439/444, 883; 470/41, 470/42
  See application file for complete search history.

(56) References Cited

U.S. PATENT DOCUMENTS

| 1,150,745 | A | * | 8/1915 | Crozier | 411/165 |
| 1,847,689 | A | * | 3/1932 | Gribbie | 439/883 |
| 1,882,089 | A | * | 10/1932 | Olson | 411/134 |
| 1,911,384 | A | * | 5/1933 | Olson | 411/155 |
| 2,559,833 | A | | 7/1951 | Stellin | |
| 3,578,506 | A | | 5/1971 | Chassoux | |
| 4,060,301 | A | * | 11/1977 | Beatty | 439/444 |
| 8,092,129 | B2 | * | 1/2012 | Wiley et al. | 411/160 |

FOREIGN PATENT DOCUMENTS

| DE | 196 00 417 | 7/1997 |
| EP | 1 583 167 | 10/2005 |
| JP | 2004-253311 | 9/2004 |
| JP | 2005-268029 | 9/2005 |
| JP | 2005-327677 | 11/2005 |
| JP | 2008-140624 | 6/2008 |
| KR | 2007-0025737 | 3/2007 |
| WO | WO 2010/030605 | 3/2010 |

OTHER PUBLICATIONS

Partial European Search Report for corresponding European patent application No. 11 161 826.0.
Minowa et al., "Simulation for the Current Density Distribution in a Contact Spot," J. Inst. of Electronics, Information and Communication Engineers, Oct. 1993, vol. J76-C-II, No. 10, pp. 637-643.

(Continued)

*Primary Examiner* — Ross Gushi
(74) *Attorney, Agent, or Firm* — David N. Lathrop

(57) ABSTRACT

A conductor-connecting washer arranged between two conductors to electrically connect the two conductors includes a metal plate portion including a washer hole in the middle and 24 or more contact protrusions integrally formed on each of both surfaces of the plate portion, 16 or more of which are bent alternately toward each of both surface sides along the outer circumference of the plate portion and 8 or more of which are bent alternately toward each of both surface sides along the inner circumference of the washer hole.

14 Claims, 13 Drawing Sheets

OTHER PUBLICATIONS

Minowa et al., "Simulation for the Current Density Distribution in a Contact Spot," Electronicsand Communications in Japan, 1994, Part 2, vol. 77, No. 2, pp. 88-95, which is submitted as a translation of the Minowa et al. IEICE paper, 1993.

Shima et al., Tribology Review, Lecture text of Dept. of Marine Electronics and Mechanic Engineering, Faculty of Marine Technology, Tokyo University of Marine Science and Technology, URL: http://www2.Kaiyodai.ac.jp/~jibiki/ouriki/text/tribology_text.pdf, p. 28.

Office Action issued on Aug. 3, 2012 by the Korean Intellectual Property Office for counterpart foreign patent application KR 10-2011-0028724.

* cited by examiner

CONDUCTOR-CONNECTING WASHER, CONNECTION MECHANISM USING THE SAME, AND METHOD OF MANUFACTURING CONDUCTOR-CONNECTING WASHER

TECHNICAL FIELD

The present invention relates to a conductor-connecting washer and a connection mechanism using the same for electrically connecting two conductors and a method of manufacturing a conductor-connecting washer.

BACKGROUND ART

A bus bar is often used for electrically connecting terminals of electrical parts such as a bipolar battery. A terminal of an electrical part and a bus bar is mainly connected by ultrasonic welding or thread-tightening. Conventional art relating to such connection of electrical parts or connection of a terminal of an electrical part and a bus bar is disclosed in Japanese Patent Application Laid Open No. 2008-140624 (hereinafter referred to as Patent literature 1), Japanese Patent Application Laid Open No. 2005-327677 (hereinafter referred to as Patent literature 2), and Japanese Patent Application Laid Open No. 2005-268029 (hereinafter referred to as Patent literature 3). Also, research on contact of two conductors has been conducted for many years, and an example of a research report relating to current density distribution in a contact portion is Isao Minowa, Mitsunobu Nakamura, "Simulation for the Current Density Distribution in a Contact Spot", Journal of the Institute of Electronics, Information and Communication Engineers, C-II, Vol. J76-C-II, No. 10, pp. 637-643, October, 1993 (hereinafter referred to as Non-patent literature 1).

Patent literature 1 shows a connecting structure in which a current-collecting body of a battery is clamped with a spring metal plate. However, it is difficult to achieve a sufficiently low contact resistance in a connection between flat surfaces with merely a spring force of a leaf spring.

In Patent literature 2, connection is made by ultrasonic welding after a protrusion section is inserted into a through hole. With this method, normal pressure load at the time of the ultrasonic welding between flat surfaces is reasonably small since an ultrasonic horn is applied to a protrusion (engagement) of a terminal. However, this does not increase strength after joining. Also, detachment cannot be made after joining.

A conductive member in Patent literature 3 is provided with numerous protrusions or grooves on both upper and lower surfaces of a washer-shaped member. By thread-tightening of the conductive member sandwiched between a terminal and a bus bar, a portion of the protrusion removes a contamination layer on the surface of the terminal to obtain a favorable connection. However, Patent literature 3 does not describe the shape or arrangement of the protrusion in detail. To obtain a favorable connection resistance, approximately the same clamp load as in a simple conventional thread-tightening is necessary depending on the shape of the protrusion, and it is necessary to control the tightening torque. Also, the disclosed conductive member can only be manufactured through cutting work or forging. Cutting work is likely to increase processing cost and is considered difficult for practical application. In the case of manufacturing by forging, the processing cost also increases, although to a lesser extent than the cutting work. Also, in the case of manufacturing by forging, it is difficult to make a protrusion with a sharp tip. Thus, it is difficult to remove an oxide with the protrusion, whereby application of considerable load is presumably necessary.

A toothed washer is a conventional art similar to the conductive member in Patent literature 3. The material is steel or phosphor bronze for a spring. The toothed washer has a gear-shaped cutout on an outer circle and an inner circle and the teeth are contorted. The purpose is to prevent a thread from loosening. Specifically, the contorted teeth are flattened by the tightening force of the thread, and the reaction force to regain a contorted state prevents the thread from loosening. However, since the contortion angle of the teeth is small, entering inside a terminal or a bus bar is not feasible even through insertion between the terminal and the bus bar. Thus, a favorable electrical connection with small load is difficult.

SUMMARY OF THE INVENTION

An object of the present invention is to provide a conductor-connecting washer and a connection mechanism using the same which can electrically connect two conductors easily and reliably with low contact resistance.

According to the present invention, a conductor-connecting washer for electrically connecting two conductors includes a metal plate portion including a washer hole in a middle, a plurality of contact protrusions formed integrally with the metal plate portion on each of both surfaces of the plate portion along an outer circumference of the plate portion, and a plurality of contact protrusions formed integrally with the metal plate portion on each of both surfaces of the plate portion along an inner circumference of the washer hole, wherein a number of the contact protrusions along the outer circumference and the contact protrusions along the inner circumference is 24 or more in total.

For the conductor-connecting washer, a copper alloy of which conductivity is approximately 40% (30% to 50%) of pure copper and which is harder than the two conductors is preferably used. It may be such that the protrusion is formed only on one of the surfaces from each position on the plate.

A connection mechanism according to the present invention for a bus bar and a terminal of an electrical part, the terminal having a plate-shaped terminal base portion, a shaft extending perpendicularly from the terminal base portion, and a terminal head secured to a front end of the shaft and having a diameter larger than the shaft, includes the conductor-connecting washer which includes a washer hole inserted with the shaft and which is arranged adjacent to the terminal base portion, a bus bar which includes a bus bar hole inserted with the shaft and which is arranged adjacent to the conductor-connecting washer, and a U-shaped cam block which has a slot inserted with the shaft and having a width smaller than a diameter of the terminal head and which is inserted between the bus bar and the terminal head, wherein a thickness of the U-shaped cam block on an open end side is smaller than a difference between a sum of a thickness of the conductor-connecting washer when not pressured and a thickness of the bus bar and a distance between the terminal base portion and the terminal head, a thickness of the U-shaped cam block on a closed end side is larger than the difference, and an inclination surface is formed between the open end side and the closed end side of the U-shaped cam block.

A connection mechanism according to another aspect of the present invention for a bus bar and a terminal of an electrical part, the terminal having a plate-shaped terminal base portion, a thread formed to extend perpendicularly from the terminal base portion, and a nut attached to a front end section of the thread and having a diameter larger than the thread, includes the conductor-connecting washer which includes a washer hole inserted with the thread and which is arranged adjacent to the terminal base portion and a bus bar which includes a bus bar hole inserted with the thread and which is arranged adjacent to the conductor-connecting washer, wherein the nut presses the bus bar toward a side of the terminal base portion to cause the contact protrusion of the conductor-connecting washer to contact the terminal base portion and the bus bar.

A method of manufacturing a conductor-connecting washer of the present invention includes a stripping step, a first protrusion forming step, a reversing step, and a second protrusion forming step. In the stripping step, a developed washer member in which a plate portion and contact protrusions are integrally formed in a state where all of the contact protrusions are flush with the surface of the plate portion is formed by cutting one metal plate. In the first protrusion forming step, the contact protrusions on one surface of the plate portion are formed by bending the contact protrusions which are parts of the developed washer member. In the reversing step, the developed washer member of which the contact protrusions are formed on one surface is reversed. In the second protrusion forming step, the contact protrusions which have not been bent in the first protrusion forming step are bent toward the side of another surface of the plate portion.

EFFECTS OF THE INVENTION

Since the conductor-connecting washer of the present invention includes contact protrusions, electrical connection can be made reliably with smaller load than when surfaces contact each other. Also, since the contact protrusions are arranged on the outer circumference and the inner circumference in consideration of the property that a current tends to concentrate at edges, current can flow efficiently with a small number of contact protrusions. That is, since the number of contact protrusions can be reduced, force applied to each contact protrusion is large, and the electrical connection can be made reliably with further smaller load than when contact protrusions are provided in a simple manner. Thus, with the conductor-connecting washer of the present invention, two conductors can be electrically connected easily and reliably with low contact resistance.

The connection mechanism of the present invention is a mechanism suitable for the conductor-connecting washer of the present invention and has a structure in which the conductor-connecting washer is sandwiched between the bus bar and the terminal base portion using the cam block or the thread. Thus, the bus bar and the terminal can be connected easily.

With the method of manufacturing a conductor-connecting washer of the present invention, the conductor-connecting washer of the present invention can be manufactured easily with a simple process from one conductive plate.

DETAILED DESCRIPTION OF THE INVENTION

Basic Aspect of the Present Invention

Figure 1A:
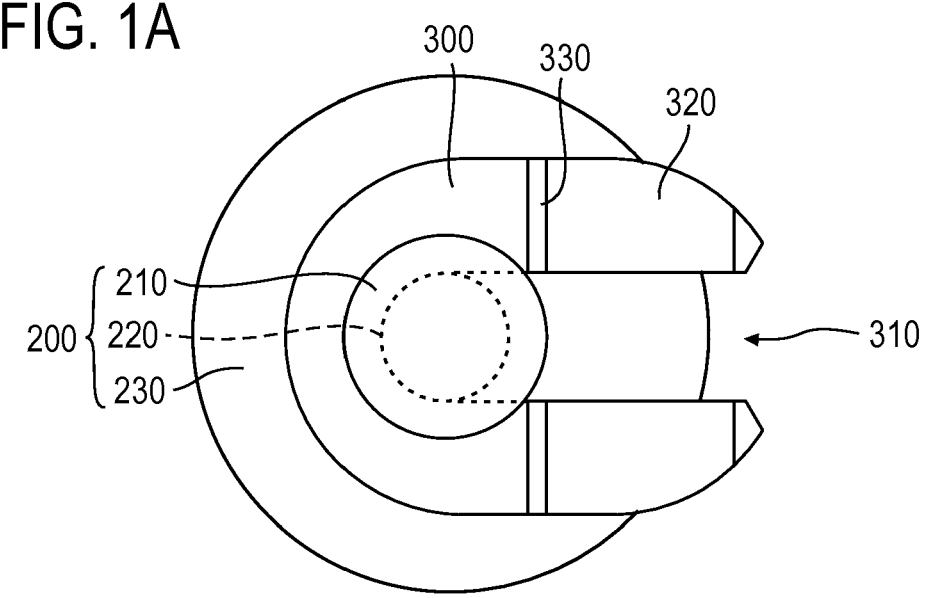
FIG. 1A is a plan view of a terminal and a cam block attached to the terminal.

The present invention mainly concerns connection of conductors where a relatively large amount of current flows. When a current flows not in such a large amount, contact resistance is not much of a concern. However, when a large current flows, it is necessary to reduce the contact resistance since the contact resistance causes large Joule heat. Thus, when a large current flows as in the connection of a terminal of an electrical part and a bus bar, it has been aimed to reduce the contact resistance through contact in an area as large as possible. As a result, a method in which surfaces are caused to contact in an area as large as possible and secured by ultrasonic welding or thread-tightening has become extensive. In this manner, the research report of Non-patent literature 1 is not utilized in a situation where reducing the contact resistance is necessary. Also, as described above, problems remain in the inventions described in Patent literatures 1 to 3.

Reference literature 1 (Masayuki SHLMA and Tatsuhiro JIBIKI, "Tribology Review," Lecture text of Department of Marine Electronics and Mechanic Engineering, Faculty of Marine Technology, Tokyo University of Marine Science and Technology, p. 28, URL: http://www2.Kaiyodai.ac.jp/~jibiki/ouriki/text/tribology_text.pdf shows the true contact area on a flat soft steel surface, and discloses that, given that the apparent contact area is 2,000 $mm^2$, the true contact area is 5 $mm^2$ with a load of 500 kgf, the true contact area is 1 $mm^2$ with 100 kgf, the true contact area is 0.2 $mm^2$ with 20 kgf, the true contact area is 0.05 $mm^2$ with 5 kgf, and the true contact area is 0.02 $mm^2$ with 2 kgf. This shows that pressing two flat pieces of metal with a large load increases the true contact area. That is, thread-tightening which is extensively used today is considered to increase the contact area by applying large load and reduce the contact resistance.

Reference literature 1 shows that the true contact area is 1/400 to 1/100000 the apparent contact area. That is, most portions are actually not in contact. Thus, in the present invention, contact protrusions are provided to a conductor-connecting washer deliberately in order to achieve reliable contact without pressing two flat-shaped conductors against each other with large load. Also, in order to achieve further reliable contact of the contact protrusions and efficient current flow to the contact protrusions, the contact protrusions are concentrated on the outer circumference and the inner circumference where current flow is easily concentrated. By arranging the contact protrusions to be concentrated on the outer circumference and the inner circumference in this manner, sufficient load can be applied to each contact protrusion since the number of contact protrusions can be reduced. Also, since the contact protrusion is formed along the outer circumference or the inner circumference, the contact protrusions can easily be manufactured with a sharp tip. Further, a phenomenon (phenomenon in which current concentrates in the vicinity of a contact portion) shown in Non-patent literature 1 is considered to occur for each contact protrusion. Thus, even if the area of the contact portion is the same, increasing the total length of the circumference of a portion contacting a conductor can increase the area of a portion where current is concentrated and thus can reduce the contact resistance. Thus, the number of contact protrusions on the outer circumference is made 16 or greater for each surface, and the number of contact protrusions on the inner circumference is made 8 or greater for each surface. The present invention is an invention created from such aspect.

An embodiment of the present invention will be described below in detail. Components having the same function are denoted by the same numeral, and redundant description is omitted.

First Embodiment

Figure 1B:
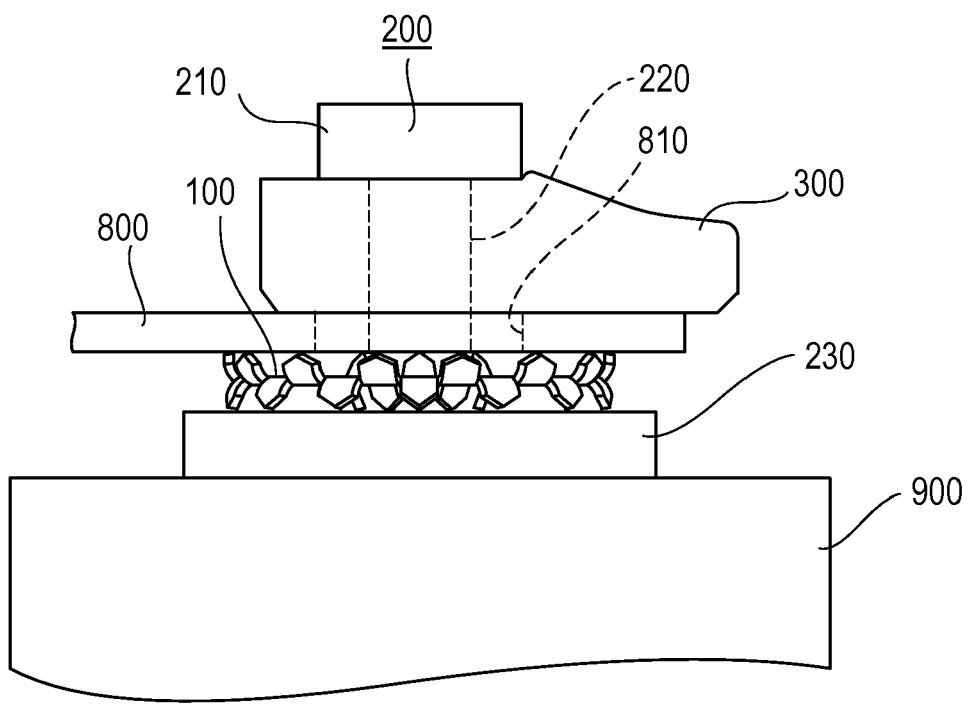
FIG. 1B is a side view showing the configuration of a connection mechanism of the present invention.
Figure 2:
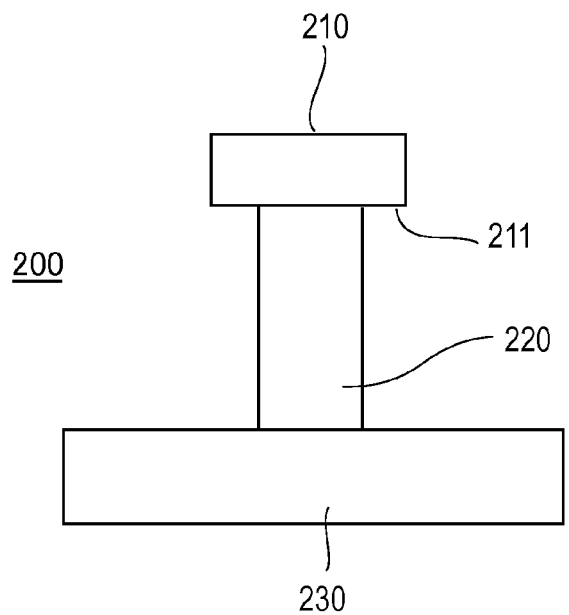
FIG. 2 is a side view of the terminal.

FIG. 1A is a plan view showing a terminal 200 used for a connection mechanism of the present invention and a cam block 300 attached to the terminal 200. FIG. 1B is a side view showing a configuration of the connection mechanism. The connection mechanism is a mechanism which connects the terminal 200 attached to an electrical part 900 and a bus bar 800 having a bus bar hole 810. The terminal 200 secured to the electrical part 900 by soldering or welding or integrally formed as a part of the electrical part includes, as shown in a side view in FIG. 2, a disc-shaped terminal base portion 230, a cylinder-shaped shaft 220 which is integrally formed perpendicularly in the middle of the terminal base portion 230, and a circular terminal head 210 which is integrally formed at the front end of the shaft 220 and larger than the diameter of the shaft 220. A conductor-connecting washer 100, the bus bar 800, and the cam block 300 are arranged in order in the direction from the terminal base portion 230 to the terminal head 210, and the shaft 220 penetrates a washer hole 130 (see FIG. 4A) of the conductor-connecting washer 100, the bus bar hole 810, and a slot 310 of the cam block 300. The cam block 300 gives pressing force to hold the conductor-connecting washer 100 between the bus bar 800 and the terminal base portion 230. Here, the diameters of the bus bar hole 810 and the washer hole 130 are larger than the diameter of the terminal head 210.

Figure 3A:
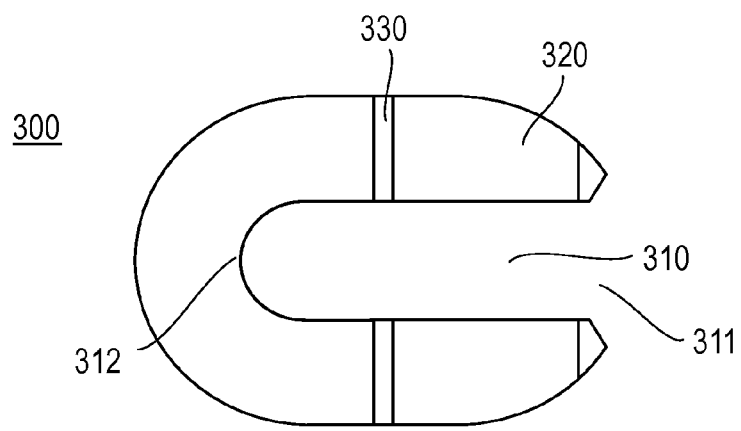
FIG. 3A is a plan view of the cam block.
Figure 3B:
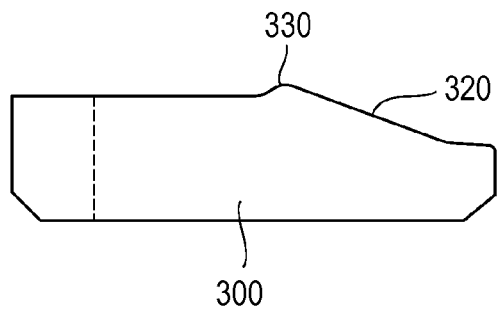
FIG. 3B is a side view of the cam block.

FIGS. 3A and 3B show the structure of the cam block 300. FIG. 3A is a plan view, and FIG. 3B is a side view. The cam block 300 is U-shaped. The width of the slot 310 formed between two arms of the U-shape is larger than the diameter of the shaft 220 and smaller than the diameter of the terminal head 210. The thickness of the cam block 300 on an open end 311 side is a thickness which enables the shaft 220 to be inserted to the slot 310 in a state where the conductor-connecting washer 100 and the bus bar 800 are attached to the shaft 220. That is, the thickness of the cam block 300 on the open end side is smaller than the difference between a sum of the thickness of the conductor-connecting washer 100 when not pressured and the thickness of the bus bar 800 and the length of the shaft 220 (distance between the terminal base portion 230 and the terminal head 210). The two arms of the cam block 300 is formed with an inclination surface 320 such that the thickness increases towards a closed end 312 side of the slot 310. Further, the thickness of the cam block 300 on the closed end 312 side of the slot 310 has a thickness in a state where the conductor-connecting washer 100 is sandwiched between the terminal base portion 230 and the bus bar 800 when the shaft 220 is inserted up to the closed end 312 of the slot 310. That is, the thickness of the cam block 300 on the closed end 312 side is larger than the difference described earlier. At the end of the inclination surface 320 of the cam block 300 on the closed end 312 side, a reversal preventing hill 330 is formed. A portion formed with the reversal preventing hill 330 is thicker than a portion of the closed end 312 of the slot 310. Thus, there is an effect of preventing the cam block 300 from detaching from the shaft 220 once the shaft 220 is completely inserted to the cam block 300.

Figure 4A:
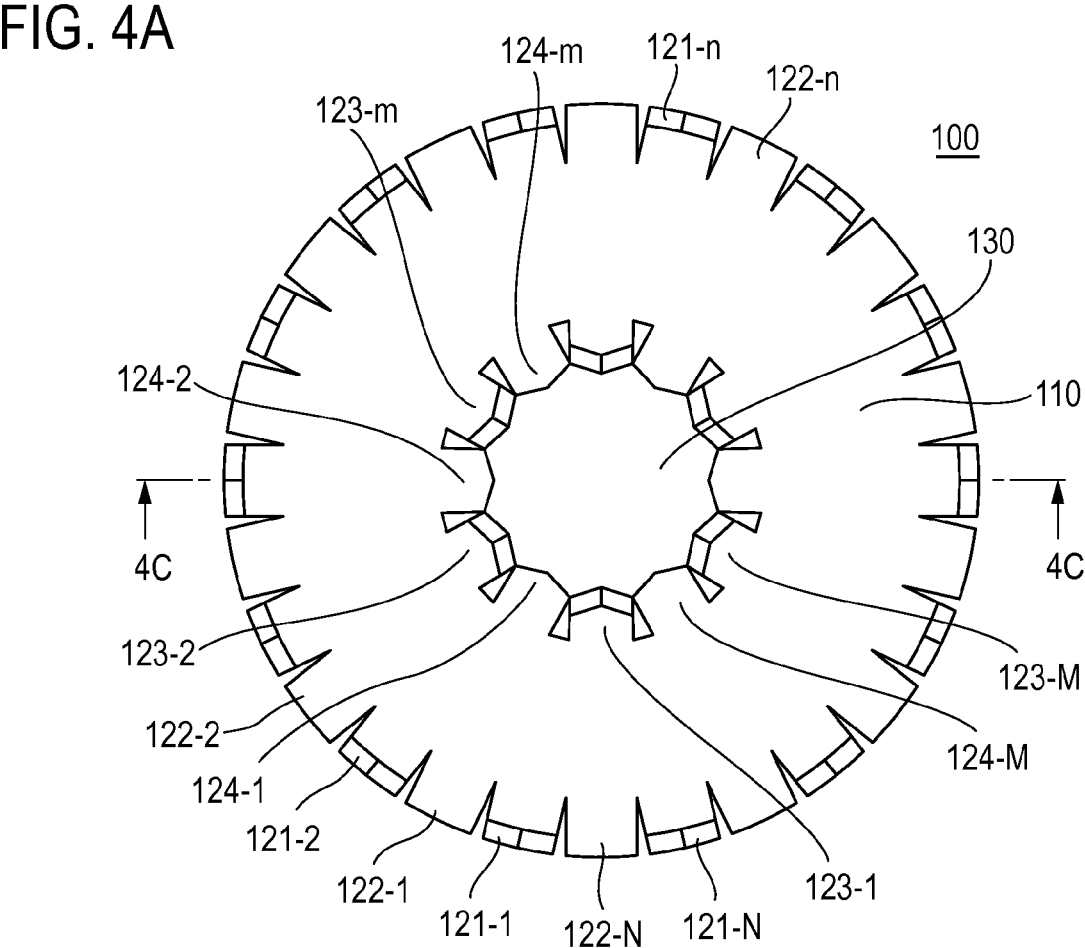
FIG. 4A is a plan view of a conductor-connecting washer of the present invention.
Figure 4B:
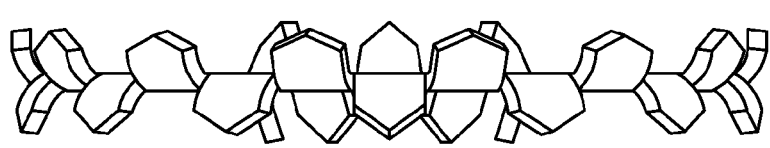
FIG. 4B is a side view of the conductor-connecting washer.
Figure 4C:
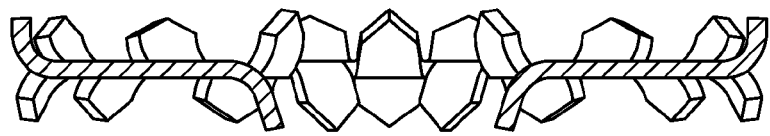
FIG. 4C is a sectional view along line 4C-4C in FIG. 4A.
Figure 5:
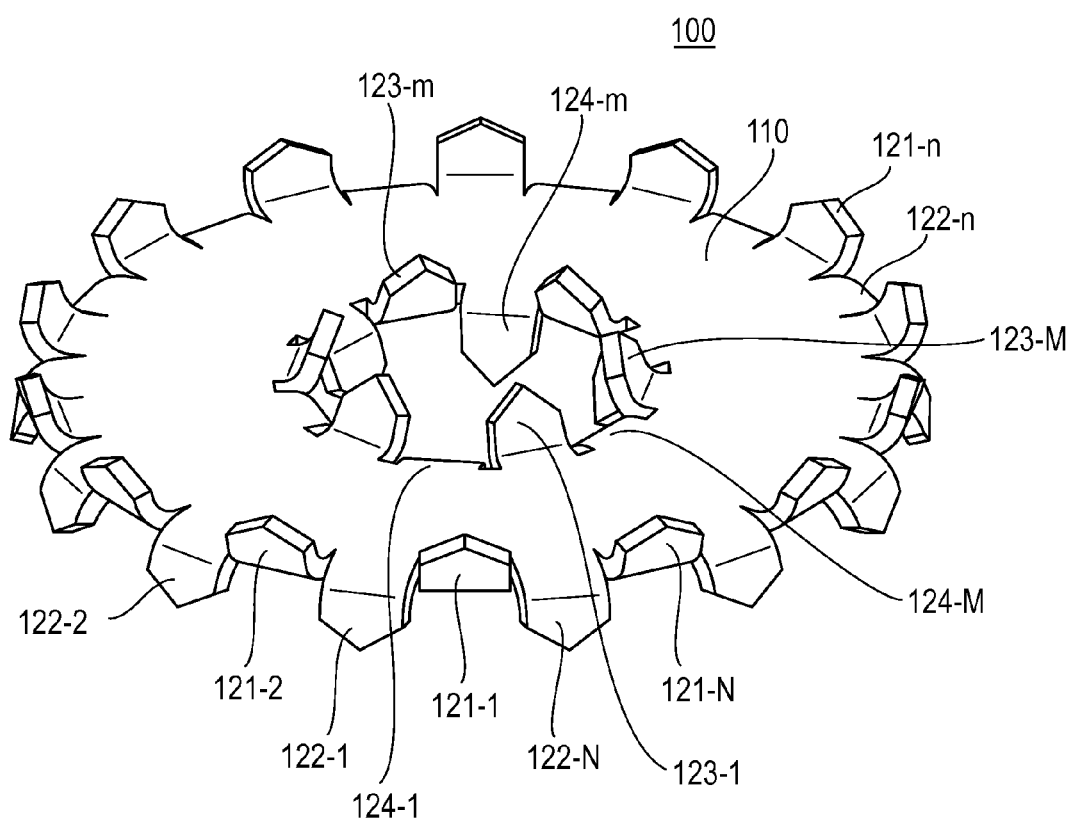
FIG. 5 is a perspective view of the conductor-connecting washer of the present invention.

FIGS. 4A, 4B, and 4C are views showing the structure of the conductor-connecting washer. FIG. 4A is a plan view, FIG. 4B is a side view, and FIG. 4C is a sectional view along line 4C-4C in FIG. 4A. FIG. 5 is a perspective view of the conductor-connecting washer. The conductor-connecting washer 100 is formed by pressing a metal plate and is formed of a circular plate portion 110 including the washer hole 130 in the middle and 24 or more contact protrusions 121-n and 122-n (n=1, 2, ..., N) and 123-m and 124-m (m=1, 2, ..., M) (note that N is an integer of 16 or greater and M is an integer of 8 or greater) cut out alternately from both surfaces of the plate portion 110 to be formed on each surface.

Specifically, the 16 or more contact protrusions 121-n and 122-n (n=1, 2, ..., N) on each surface are formed to protrude alternately from opposite surfaces along the outer circumference of the circular plate portion, and the 8 or more contact protrusions 123-m and 124-m (m=1, 2, ..., M) on each surface are formed to protrude alternately from opposite surfaces along the inner circumference of a hole formed in the middle of the plate portion. The washer hole 130 which is defined by a circle circumscribing the contact protrusions 123-m and 124-m formed along the inner circumference of the hole is larger than the diameter of the terminal head 210 and smaller than the outer shape of a curved portion of the cam block 300. The bus bar hole 810 is also larger than the diameter of the terminal head 210 and smaller than the outer shape of the conductor-connecting washer 100. However, if a slot is formed by cutting the bus bar 800 and the conductor-connecting washer 100 from the end side in place of the bus bar hole 810 and the washer hole 130 as in a modification described later, the width of the slot may be smaller than the diameter of the terminal head 210 as long as the shaft 220 can be passed through.

The conductor-connecting washer 100 desirably has a close conductivity to pure copper in terms of reducing the contact resistance. On the other hand, using copper alloy which is harder than the bus bar 800 and the terminal 200 makes it easy to reduce the contact resistance since the contact protrusion bites into a conductor surface of the bus bar 800 and the terminal base portion 230. However, increasing the hardness of the copper alloy reduces the conductivity. Thus, as the conductor-connecting washer 100, copper alloy having a conductivity of 30% to 50% of pure copper is preferably used. Particularly, copper alloy having a conductivity of approximately 40% of pure copper exhibits favorable properties in terms of conductivity and in terms of mechanical characteristics (hardness and degree of elasticity).

Figure 6:
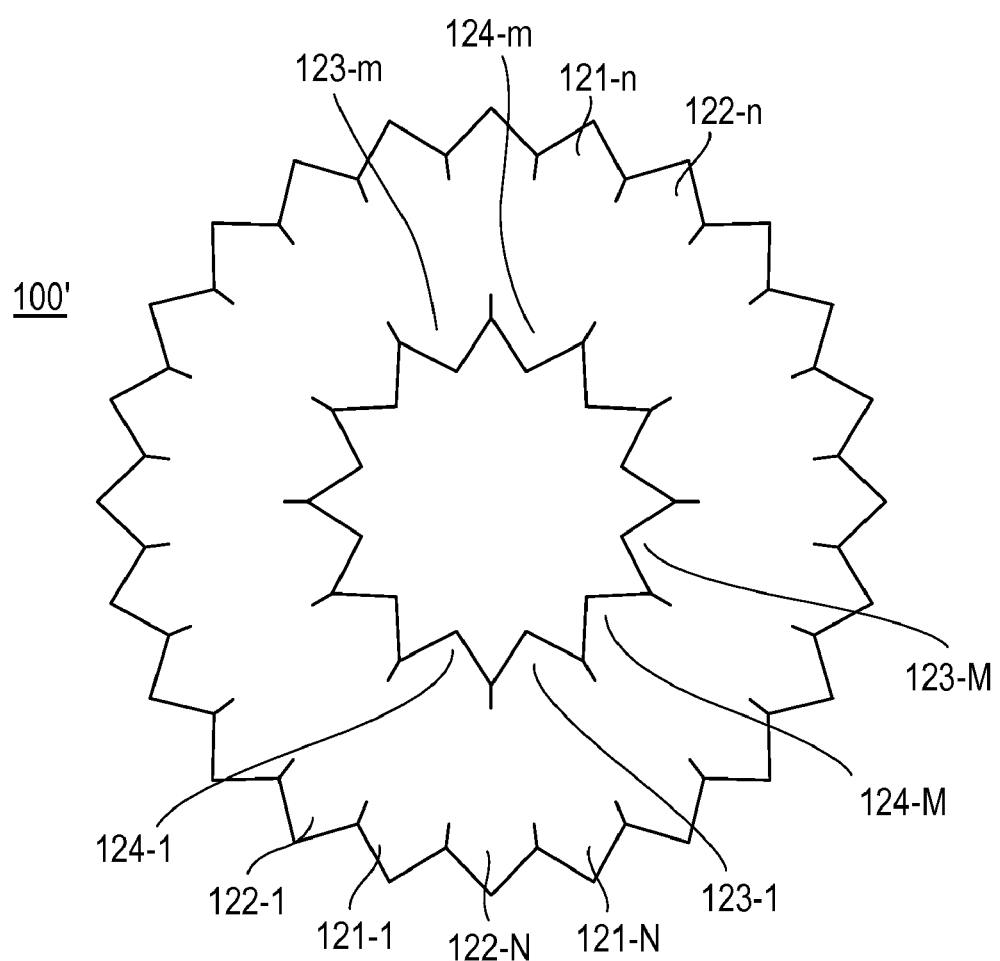
FIG. 6 is a plan view showing a developed washer member which is the conductor-connecting washer in a flattened state.

In FIG. 4A, the contact protrusions 121-n and 122-n and the contact protrusions 123-m and 124-m (note that n is an integer between 1 and N, and m is an integer between 1 and M) are provided alternately along the outer circumference and the inner circumference, respectively. However, the contact protrusions may be formed on both surfaces from the same positions of the plate portion 110 (two-dimensional positions along the surface of the plate). Nonetheless, forming such protrusions on both surfaces from one position requires forging or cutting a block instead of pressing, and therefore is hardly practical. On the other hand, if the protrusions are formed alternately along the outer circumference and the inner circumference of the plate portion 110 as in FIG. 4A, the conductor-connecting washer 100 can be manufactured easily by stripping from one conductive plate. FIG. 6 is a plan view showing the conductor-connecting washer being in a flattened state (so that the direction of the protrusion lies in a plane in which the surface of the plate extends). Specifically, manufacturing is easily done through a stripping step S151, a first protrusion forming step S152, a reversing step S153, and a second protrusion forming step S154. In the stripping step S151, a developed washer 100' in which the plate portion 110 and the contact protrusions 121-n, 122-n, 123-m, and 124-m are formed integrally in a state where the directions of all of the contact protrusions 121-n, 122-n, 123-m, and 124-m lie in the surface of the plate portion 110 is formed by cutting one conductive plate. In the first protrusion forming step S152, the contact protrusions 121-n and 123-m on one surface of the plate portion 110 are formed by bending the contact protrusions 121-n and 123-m which are part of the developed washer member 100'. In the reversing step S153, the developed washer member 100' of which the contact protrusions are formed on one surface is reversed. In the second protrusion forming step S154, the contact protrusions 122-n and 124-m which have not been bent in the first protrusion forming step are bent toward the other surface side of the plate portion 110. The conductor-connecting washer shown in FIG. 4A can be manufactured easily with such a method. Also, tips of the contact protrusions 121-n, 122-n, 123-m, and 124-m are formed through the stripping step S151 and thus can be made sharp. The front end angle of each contact protrusion is preferably 50 to 70 degrees. Also, in the first protrusion forming step S152 and the second protrusion forming step S154, the contact protrusions are preferably bent at an angle greater than 60 degrees and smaller than 90 degrees with respect to the plate portion 110.

Figure 7:
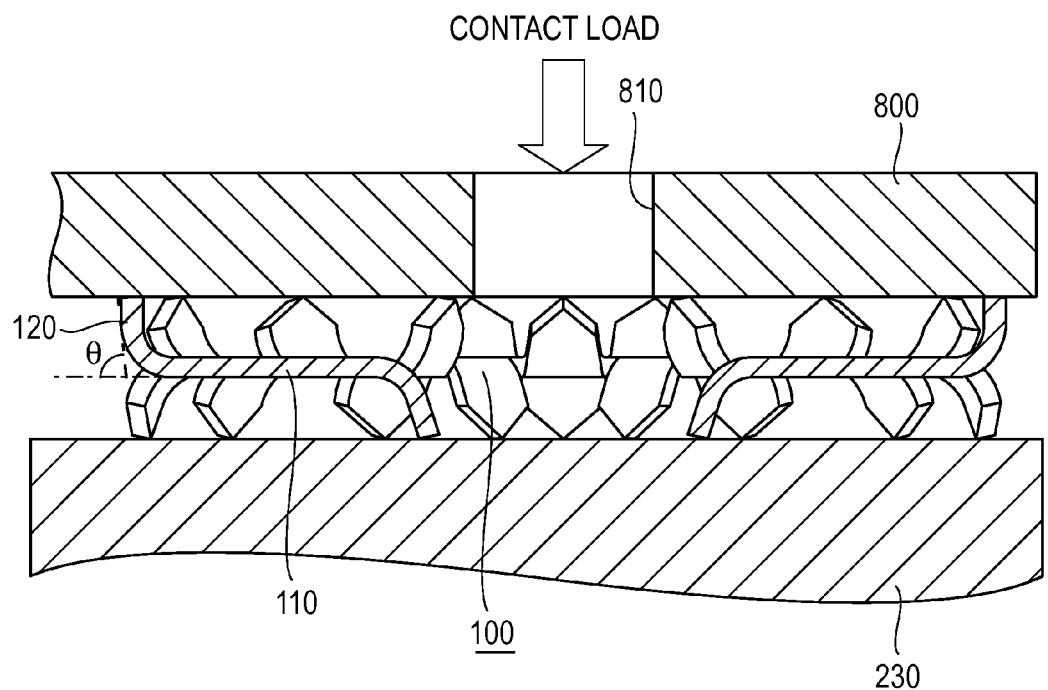
FIG. 7 is a sectional view of a state where the conductor-connecting washer is sandwiched between a bus bar and a terminal base portion.

FIG. 7 is a sectional view of a state where the conductor-connecting washer is sandwiched between the bus bar 800 and the terminal base portion 230. When an angle θ between the direction of the contact protrusions 121-n, 122-n, 123-m, and 124-m (denoted collectively by reference numeral 120 in FIG. 7) and the surface of the plate portion 110 is smaller than 90 degrees as described above, the contact protrusions 121-n, 122-n, 123-m, and 124-m wipe the surface of the terminal base portion 230 or the bus bar 800 depending on the applied load and bite in further than in the case of 90 degrees. Thus, a favorable contact is easily achieved. When the angle θ between the direction of the contact protrusions 121-n, 122-n, 123-m, and 124-m and the surface of the plate portion 110 is too small, the contact protrusions are easily curved and hardly bite into the terminal base portion 230 or the bus bar 800 even with load applied. Thus, the angle θ between the direction of the contact protrusions 121-n, 122-n, 123-m, and 124-m and the surface of the plate portion 110 is desirably greater than 60 degrees. Although the load is largest when passing the reversal preventing hill 330 of the cam block 300 and becomes slightly smaller after passing, slight deflection of the contact protrusions 121-n, 122-n, 123-m, and 124-m and elasticity of the entire conductor-connecting washer 100 maintain the load necessary for connection.

Figure 8:
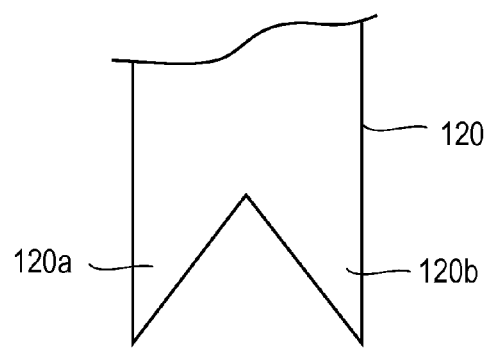
FIG. 8 is a view showing a modification of a contact protrusion.

The front end of each contact protrusion of the conductor-connecting washer 100 described above is tapered such that contact with the terminal base portion 230 is made at a single point. However, for example, two tapered contact sections 120a and 120b may be formed by dividing a front end section into two such that contact with the terminal base portion 230 is made at two points, as shown with the front end of one contact protrusion 120 in FIG. 8. The two contact sections 120a and 120b may be formed to be flush with one another or may be formed by further bending one toward the inside in the radial direction of the conductor-connecting washer 100 so that two contact points are displaced in the radial direction. The structure of the contact protrusion in FIG. 8 may be applied in the modification described below.

Since the conductor-connecting washer of the present invention includes the contact protrusions as described above, electrical connection can be made reliably with smaller load than when surfaces contact each other. Also, since the contact protrusions are arranged along the outer circumference and the inner circumference in consideration of the property of current concentrating at edges, current can flow efficiently with a small number of contact protrusions. That is, since the number of the contact protrusions can be reduced, the electrical connection can be made reliably with further smaller load than when a contact protrusion is provided in a simple manner. Thus, with the conductor-connecting washer of the present invention, two conductors can be electrically connected easily and reliably with low contact resistance. Also, since a small load would suffice, a stable connection can be ensured even with a pressure mechanism using a cam block.

The connection mechanism of the present invention is a mechanism suitable for the conductor-connecting washer of the present invention and has a structure in which the conductor-connecting washer is sandwiched between the bus bar and the terminal using the cam block. Thus, the bus bar and the terminal can be connected easily.

A method of manufacturing a conductor-connecting washer of the present invention is a method of manufacturing the conductor-connecting washer of the present invention from one conductive plate, and the conductor-connecting washer can be manufactured with a simple process.

Modification

Figure 9:
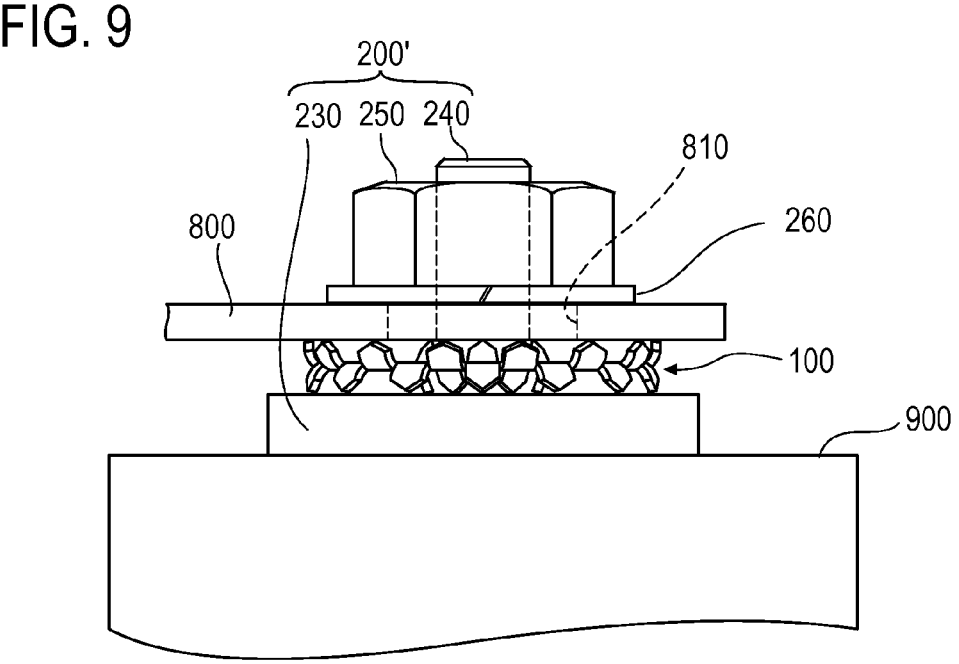
FIG. 9 is a side view showing another configuration of the connection mechanism of the present invention.

Although an example of the connection mechanism which applies a cam block for pressing has been shown in the embodiment in FIG. 1, the connection mechanism may apply thread-tightening for pressing without the use of a cam, as shown in FIG. 9. That is, in this modification, a thread 240 which functions as a shaft is integrally formed perpendicularly from the terminal base portion 230 of a terminal 200', the thread 240 is inserted through the conductor-connecting washer 100 and the bus bar 800, and a nut 250 which functions as a terminal head presses a washer 260 from above the bus bar 800.

Figure 10:
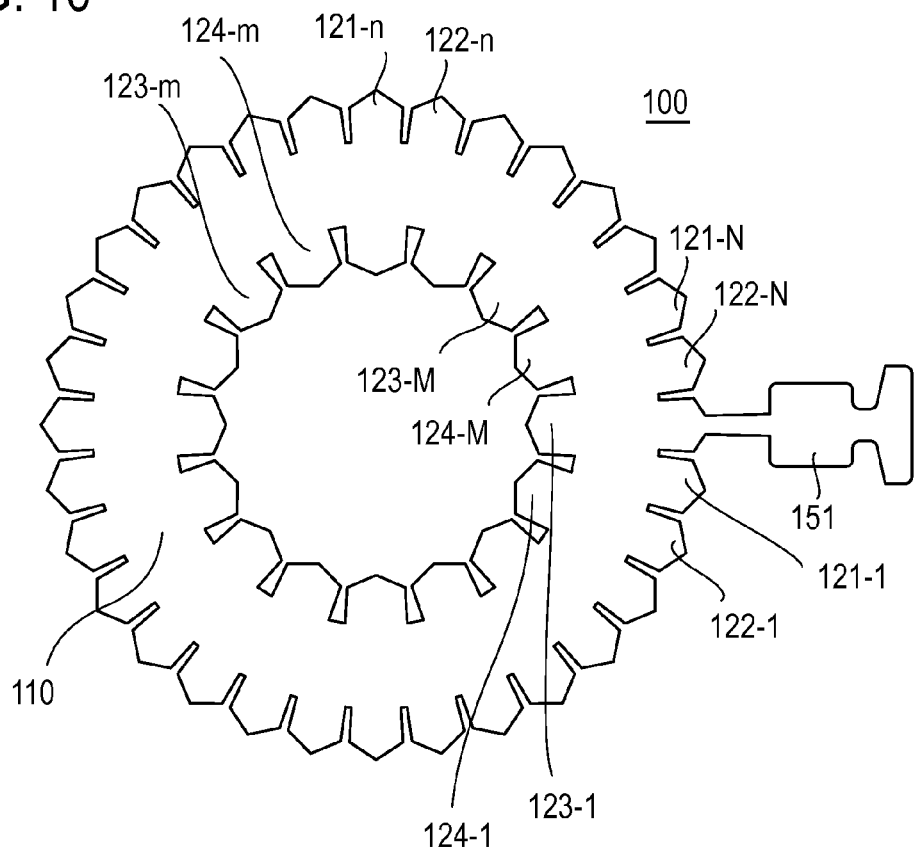
FIG. 10 is a plan view of a flattened conductor-connecting washer including a pressure section.

FIG. 10 is a plan view of the conductor-connecting washer according to a modification in a flattened state. The conductor-connecting washer 100 includes a connection section 151. One end of the connection section 151 is secured to the outer circumference of the plate portion 110. The connection section 151 is means for connecting a part different from the terminal base portion with which the contact protrusions 121-n, 122-n, 123-m, and 124-m contact. For example, the connection section 151 can be used as a crimp terminal for connection with another electrical circuit. Providing the connection section in this manner is convenient for measurement of voltage or the like. The conductor-connecting washer of this modification can be made by bending the contact protrusion in FIG. 10.

Figure 11:
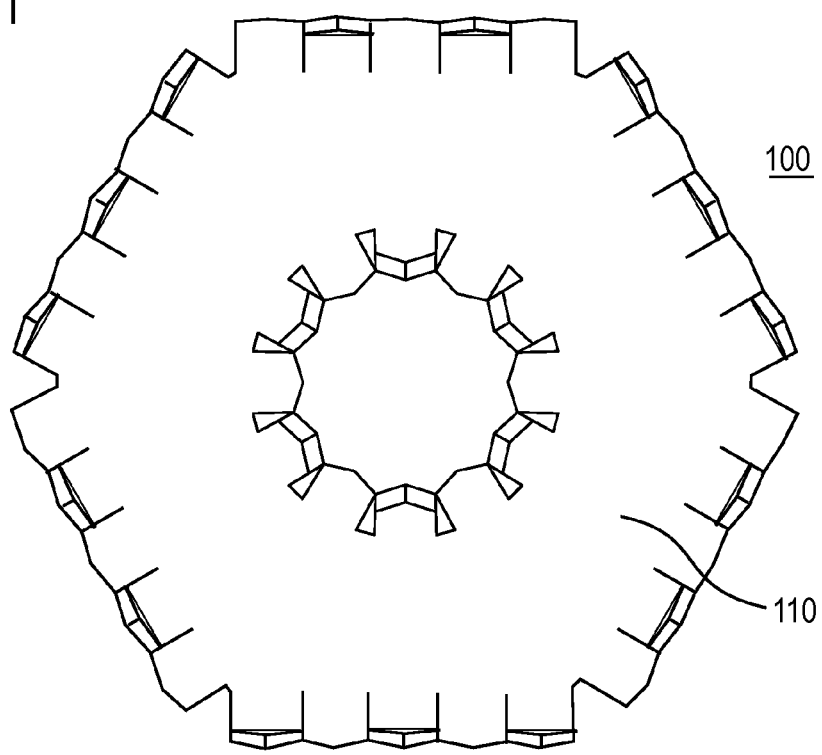
FIG. 11 is a plan view showing a modification of the conductor-connecting washer.

FIG. 11 shows the conductor-connecting washer 100 according to another modification. The difference from that in FIG. 4A is that the outer circumference forms a hexagon instead of a circle, and the contact protrusions are formed along each side of the hexagon. Otherwise, it is the same as in FIG. 4A. It is clear that the outer circumference is not limited to a hexagon and may be an arbitrary polygon. However, a regular polygon having 5 or more sides is preferable.

Figure 12:
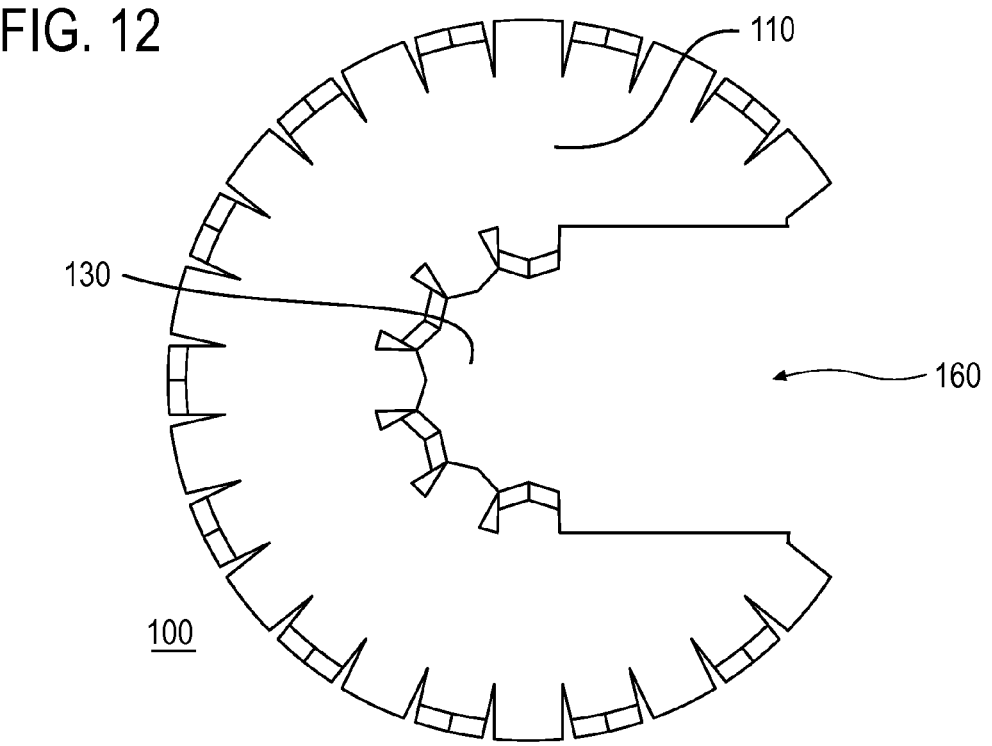
FIG. 12 is a plan view showing another modification of the conductor-connecting washer.

FIG. 12 shows another modification of the conductor-connecting washer 100. The difference from FIG. 4A is that the inner circumference of the washer hole 130 in the middle is not closed and a slot 160 is formed as a cutout having the same width as the diameter of the washer hole 130 from the middle up to the outer circumference of the conductor-connecting washer 100.

With this configuration, the diameter of the washer hole 130 can be made larger than the diameter of the shaft 220 and smaller than the diameter of the terminal head 210. Although not shown in the drawing, a slot may be formed also in the conductor-connecting washer 100 shown in FIG. 11 in a similar manner as in FIG. 12 as a cutout having a width which is the same as the diameter of the washer hole 130 from the washer hole 130 up to one side of a polygon.

Experiment And Simulation

Figure 13:
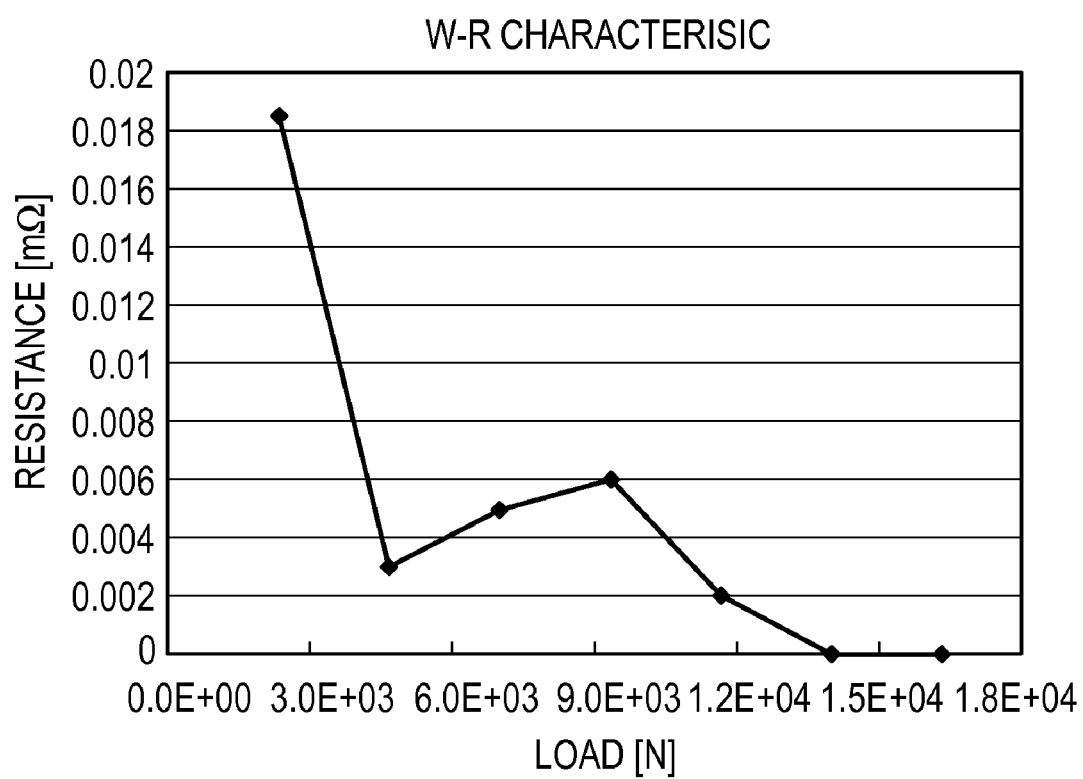
FIG. 13 is a view showing a result of measuring the relationships between the clamp load and the contact resistance when two bus bars are directly tightened with threads.
Figure 14:
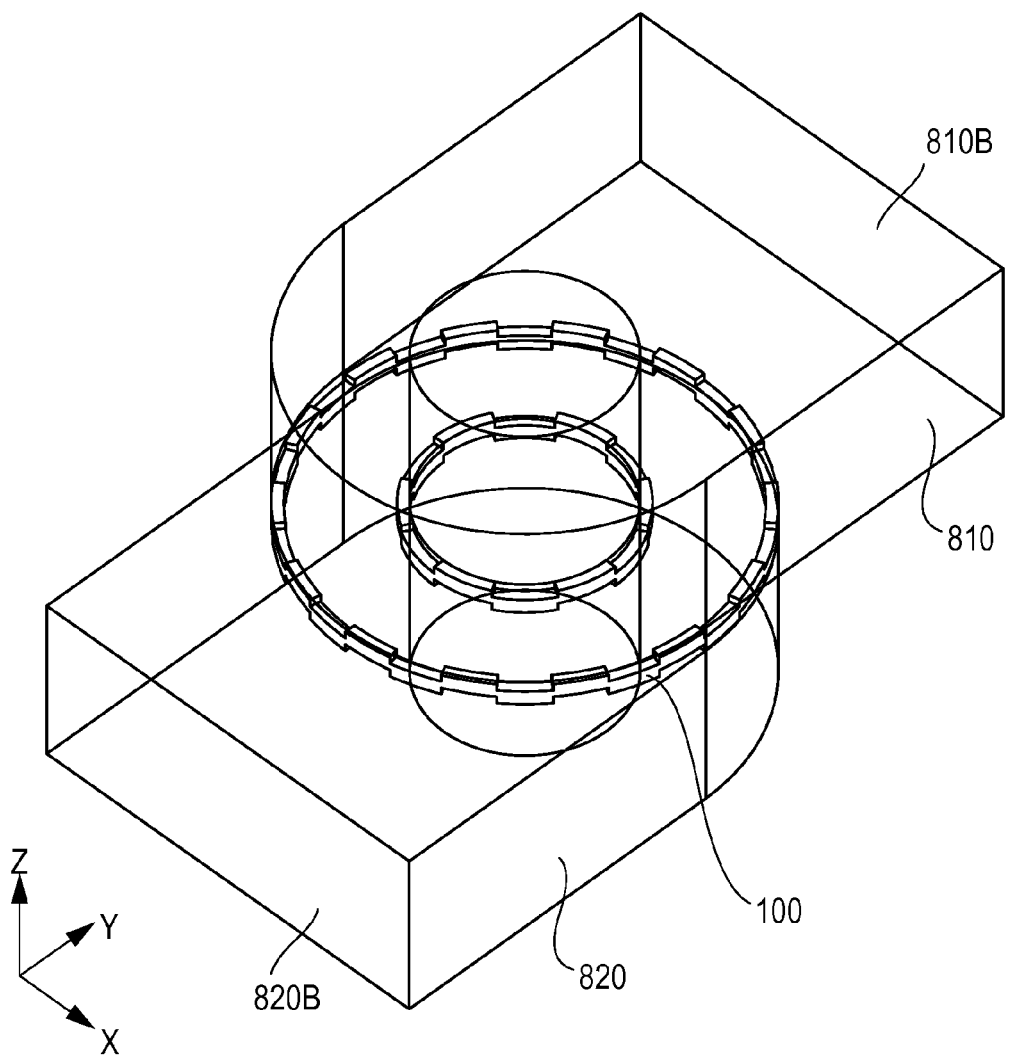
FIG. 14 is a view showing the configuration of the two bus bars and the conductor-connecting washer used for simulation.
Figure 15:
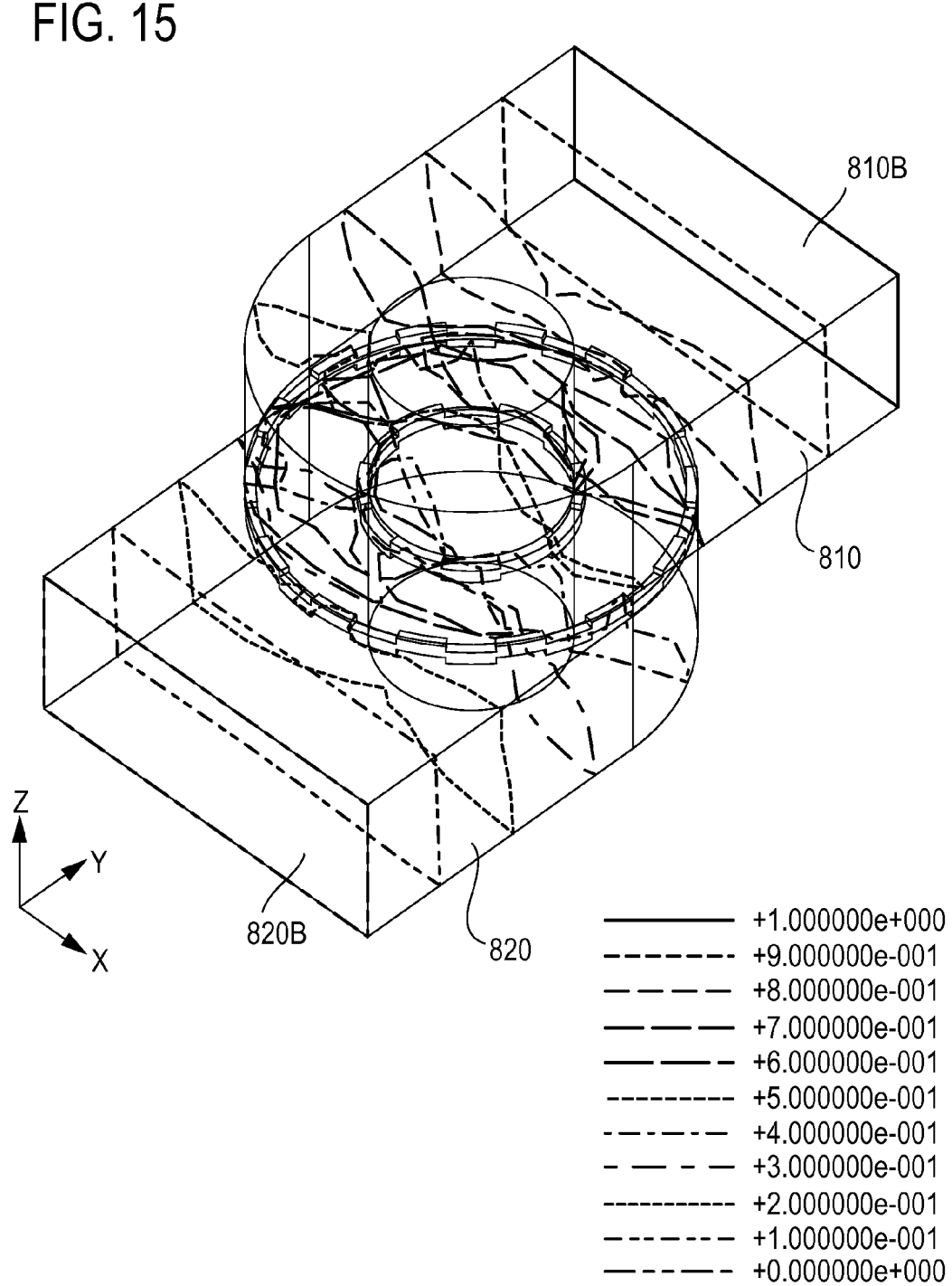
FIG. 15 is a view showing the distribution of voltage when a surface 820B of a bus bar 820 is 1 V and a surface 810B of a bus bar 810 is 0 V.

FIG. 13 is a result of measuring the relationships between the clamp load and the contact resistance when two bus bars are directly tightened with threads. This shows that the resistance tends to be smaller with larger load. FIG. 14 shows the configuration of two bus bars 810 and 820 and the conductor-connecting washer 100 used for simulation. The two bus bars 810 and 820 are in a state holding the conductor-connecting washer 100 in between. In an example in this drawing, the numbers of upper and lower contact protrusions are respectively 20. In FIG. 15, equipotential lines show the distribution of voltage when a vertical surface 820B of the bus bar 820 is 1 V and a vertical surface 810B of the bus bar 810 is 0 V. Such distribution of voltage was analyzed to obtain the contact resistance.

Figure 16A:
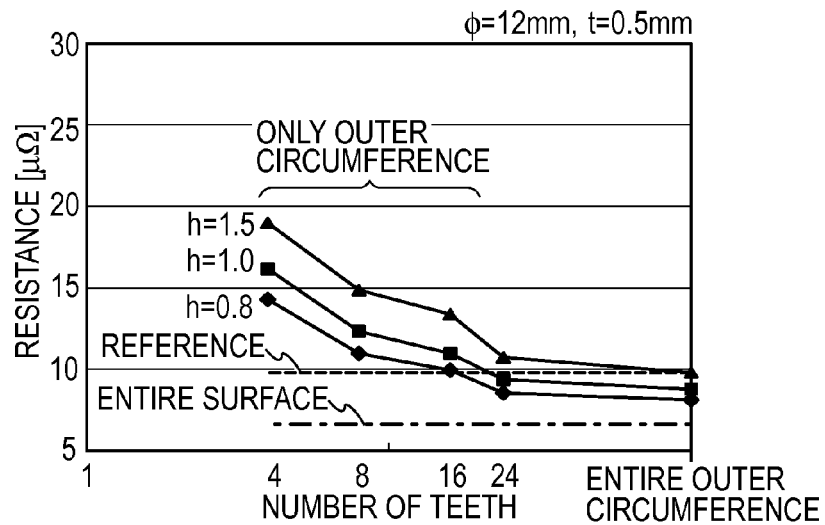
FIG. 16A is a view showing the relationships between a resistance value and the number of protrusions (number of teeth) on one surface when the diameter of the conductor-connecting washer is 12 mm and the thickness is 0.5 mm.
Figure 16B:
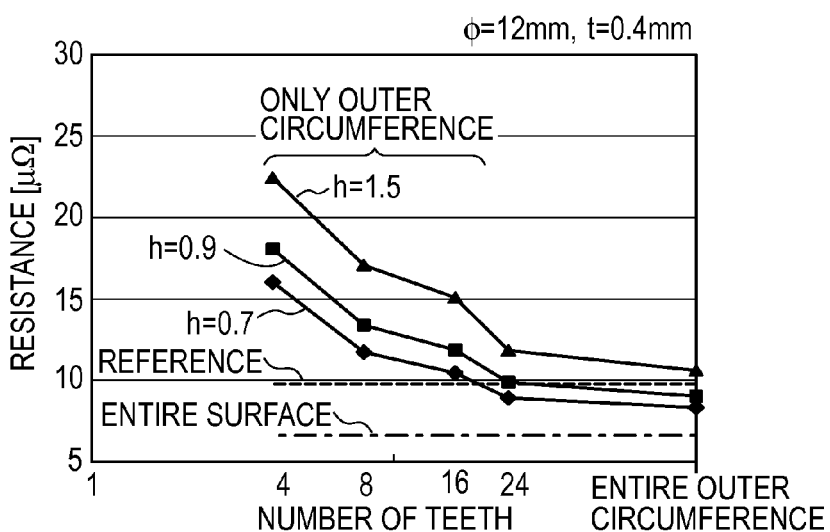
FIG. 16B is a view showing the relationships between the resistance value and the number of protrusions (number of teeth) on one surface when the diameter of the conductor-connecting washer is 12 mm and the thickness is 0.4 mm.
Figure 16C:
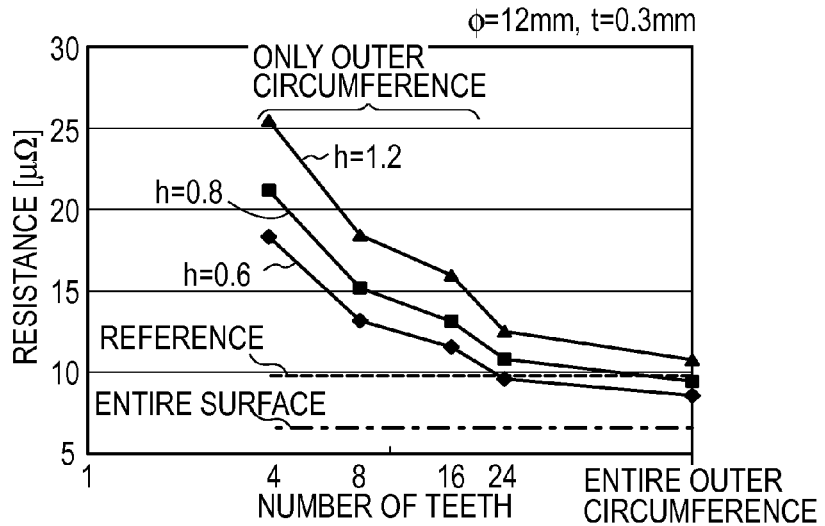
FIG. 16C is a view showing the relationships between the resistance value and the number of protrusions (number of teeth) on one surface when the diameter of the conductor-connecting washer is 12 mm and the thickness is 0.3 mm.
Figure 17A:
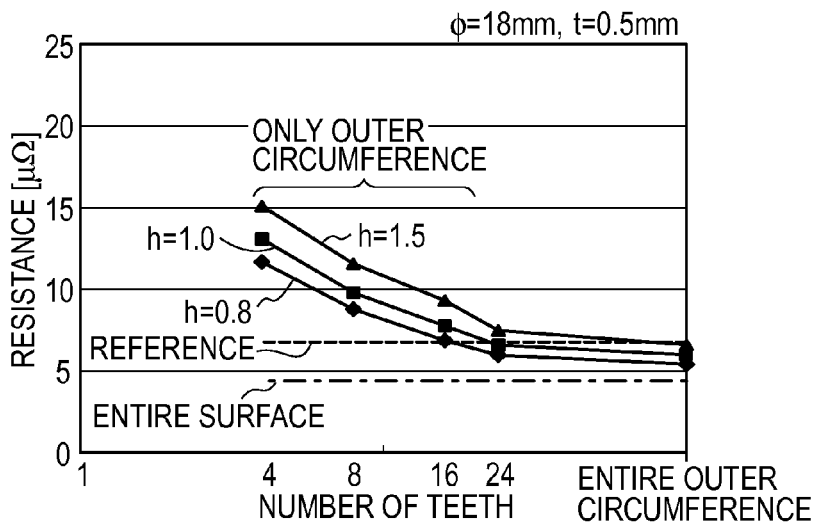
FIG. 17A is a view showing the relationships between the resistance value and the number of protrusions (number of teeth) on one surface when the diameter of the conductor-connecting washer is 18 mm and the thickness is 0.5 mm.
Figure 17B:
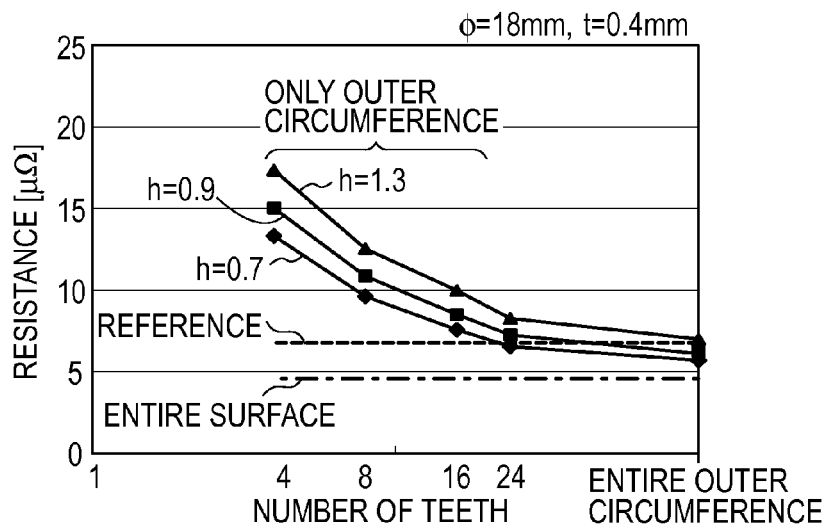
FIG. 17B is a view showing the relationships between the resistance value and the number of protrusions (number of teeth) on one surface when the diameter of the conductor-connecting washer is 18 mm and the thickness is 0.4 mm.
Figure 17C:
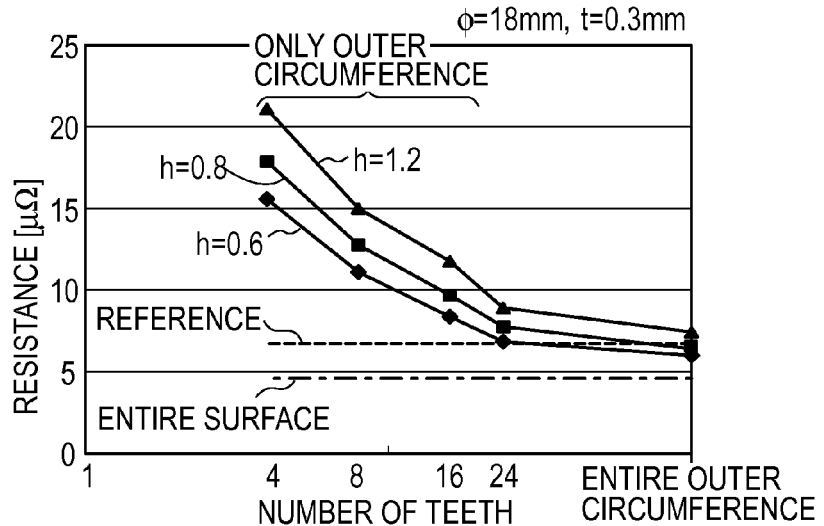
FIG. 17C is a view showing the relationships between the resistance value and the number of protrusions (number of teeth) on one surface when the diameter of the conductor-connecting washer is 18 mm and the thickness is 0.3 mm.

FIGS. 16A, 16B, and 16C are graphs each showing results obtained from simulation to determine the relationships between a resistance value and the number of contact protrusions (expressed as "number of teeth" in the drawings) on one surface when the diameter ($\phi$) of the conductor-connecting washer 100 is 12 mm. FIGS. 17A, 17B, and 17C are graphs each showing the relationships between the resistance value and the number of contact protrusions (number of teeth) on one surface when the diameter ($\phi$) of the conductor-connecting washer is 18 mm as results of simulation in a similar manner. FIGS. 16A and 17A show a case where the thickness (t) of the plate portion 110 is 0.5 mm, FIGS. 16B and 17B show a case where the thickness (t) of the plate portion 110 is 0.4 mm, and FIGS. 16C and 17C show a case where the thickness (t) of the plate portion 110 is 0.3 mm. In the drawing, h refers to the length of the contact protrusion, and line "entire surface" refers to the contact resistance when the bus bars 810 and 820 are caused to contact each other on the entire surface, and line "reference" shows a value 1.5 times that of the case of entire surface contact, which is where the resistance value becomes stable (becomes linear). When the number of teeth is 4, 8, and 16, the contact protrusions are provided only on the outer circumference. By virtually changing the area of contact for each tooth, the total area of contacts of the bus bars 810 and 820 is made the same for any of the numbers of teeth. The number of teeth being 24 shows a case where 16 contact protrusions are provided on the outer circumference and 8 on the inner circumference. The 16 contact protrusions on the outer circumference are the same as when the number of teeth is 16. That is, when the number of teeth is 24, the area of contact with the bus bars 810 and 820 also increases. The resistance value shown in at the rightmost position (position where the number of teeth is supposed to be 100) in each graph shows a case where a ring-shaped protrusion is provided with a width equivalent to the thickness of the plate only on the outer circumference (a case where the entire outer circumference is in contact). The area of the bus bars 810 and 820 in contact at this time is twice that of when the number of teeth is 16.

All lines in FIGS. 16A, 16B, 16C, 17A, 17B, and 17C commonly indicate that the resistance value decreases as the number of teeth increases from 4 to 8 to 16. Thus, this shows that the contact resistance decreases when the length of the circumference of the contact protrusion increases, even if the contact area is the same. Also, in contrast to when the number of teeth is 4, 8, or 16, there is a bump when the number of teeth is 24. This is considered to be an effect of providing the protrusion also on the inner circumference. Also shown is that there is not a large difference in the resistance value between when the number of teeth is 24 (16 on the outer circumference and 8 on the inner circumference) and when the entire outer circumference is in contact. The entire surface contact in this simulation produces a result for a case of an ideal entire surface contact. However, since the entire surface does not come into contact in reality, the contact resistance obtained from actual measurement is expected to be approximately the resistance value shown by the reference. Thus, by making the number of contact protrusions on the outer circumference to be 16 or more for each surface and the number of contact protrusions on the inner circumference to be 8 or more for each surface, it is expected that the entire surface contact can produce a contact resistance close to when load is applied by thread-tightening or the like.

INDUSTRIAL APPLICABILITY

The present invention can be used for connection of conductors where a relatively large amount of current flows.

What is claimed is:

1. A battery terminal-busbar connecting washer for electrically connecting a battery terminal and a busbar, comprising:
   a metal plate portion including a washer hole in a middle;
   a plurality of first contact protrusions formed integrally with the metal plate portion radially extending from an outer circumference of the metal plate portion; and
   a plurality of second contact protrusions formed integrally with the metal plate portion radially extending from an inner circumference of the washer hole; wherein
   a number of the first and second contact protrusions formed in the metal plate portion is 24 or more in total;
   wherein the first and the second contact protrusions are bent at an angle larger than 60° and smaller than 90° along the outer circumference of the metal plate portion and the inner circumference of the washer hole, respectively, to protrude alternately from opposite surfaces of the metal plate portion along the outer circumference and the inner circumference.

2. The battery terminal-busbar connecting washer according to claim 1, wherein the number of the first contact protrusions along the outer circumference is 16 or more for each of both surfaces of the metal plate portion and the number of the second contact protrusions along the inner circumference is 8 or more for each of both the surfaces of the metal plate portion.

3. The battery terminal-busbar connecting washer according to claim 1, wherein the battery terminal-busbar connecting washer is formed of metal harder than the two conductors.

4. The battery terminal-busbar connecting washer according to any one of claims 1 to 3, wherein the battery terminal-busbar connecting washer is formed of copper alloy of which conductivity is 30% to 50% of pure copper.

5. The battery terminal-busbar connecting washer according to any one of claims 1 to 3, wherein a slot is formed as a cutout having a width which is a diameter of the washer hole from a middle of the washer hole up to an edge on the outer circumference of the metal plate portion.

6. The battery terminal-busbar connecting washer according to any one of claims 1 to 3, wherein the outer circumference of the metal plate portion forms a circle.

7. The battery terminal-busbar connecting washer according to any one of claims 1 to 3, wherein the outer circumference of the metal plate portion forms a regular polygon.

8. The battery terminal-busbar connecting washer according to any one of claims 1 to 3, wherein each contact protrusion is tapered toward a front end.

9. The battery terminal-busbar connecting washer according to any one of claims 1 to 3, wherein a front end section of each contact protrusion is divided into two, each tapered toward a front end.

10. The battery terminal-busbar connecting washer according to any one of claims 1 to 3, further comprising a connection section which is formed as an extension of a part of the outer circumference of the metal plate portion for connection with an external conductor other than the battery terminal and the busbar.

11. A battery terminal-busbar connection mechanism for a bus bar and a terminal of part a battery, the terminal having a plate-shaped terminal base portion, a shaft extending perpendicularly from the terminal base portion, and a terminal head secured to a front end of the shaft and having a diameter larger than the shaft, the connection mechanism comprising:
   a battery terminal-busbar connecting washer according to any one of claims 1 to 3 which includes a washer hole inserted with the shaft and which is arranged adjacent to the terminal base portion;
   a bus bar which includes a bus bar hole inserted with the shaft and which is arranged adjacent to the battery terminal-busbar connecting washer; and
   a U-shaped cam block which includes a slot inserted with the shaft and having a width smaller than a diameter of the terminal head and which is inserted between the bus bar and the terminal head;
wherein:
   a thickness of the U-shaped cam block on an open end side is smaller than a difference between a sum of a thickness of the battery terminal-busbar connecting washer when not pressured and a thickness of the bus bar and a distance between the terminal base portion and the terminal head;
   a thickness of the U-shaped cam block on a closed end side is larger than the difference; and
   an inclination surface is formed between the open end side and the closed end side of the U-shaped cam block.

12. The connection mechanism according to claim 11, wherein a reversal preventing hill is formed so that the U-shaped cam block is thickest midway between a closed and an open end.

13. A battery terminal-busbar connection mechanism for a bus bar and a terminal of a battery, the terminal having a plate-shaped terminal base portion, a thread formed to extend perpendicularly from the terminal base portion, and a nut attached to a front end section of the thread and having a diameter larger than the thread, the connection mechanism comprising:
   a battery terminal-busbar connecting washer according to any one of claims 1 to 3 which includes a washer hole inserted with the thread and which is arranged adjacent to the terminal base portion; and
   a bus bar which includes a bus bar hole inserted with the thread and which is arranged adjacent to the battery terminal-busbar connecting washer; wherein
   the nut presses the bus bar toward a side of the terminal base portion to cause the first and the second contact protrusions of the battery terminal-busbar connecting washer to contact the terminal base portion and the bus bar.

14. A method of manufacturing the battery terminal-busbar connecting washer according to claim 1, comprising:
   a stripping step of forming a developed washer member in which the metal plate portion and the contact protrusion are integrally formed in a state where all of the contact protrusions are flush with a surface of the metal plate portion by cutting one metal plate;
   a first protrusion forming step of forming alternate ones of the first contact protrusions and alternate ones of the second contact protrusions on one surface of the metal plate portion by bending, toward a side of one surface of the metal plate portion, alternate ones of the first and the second contact protrusions, which are parts of the developed washer member, along the outer circumference of the metal plate portion and the inner circumference of the washer hole, respectively, at an angle larger than 60' and smaller than 90°;
   a reversing step of reversing the developed washer member in which the contact protrusion is formed on one surface; and a second protrusion forming step of bending, toward a side of another surface of the metal plate portion, the other alternate ones of the first contact protrusions and the other alternate ones of the second contact protrusions which have not been bent in the first protrusion forming step, along the outer circumference of the metal plate portion and the inner circumference of the washer hole, respectively, at an angle larger than 60° and smaller than 90°.

* * * * *